(12) United States Patent
Newman et al.

(10) Patent No.: US 8,381,758 B2
(45) Date of Patent: Feb. 26, 2013

(54) SAFETY RELIEF FILL VALVE ASSEMBLY

(75) Inventors: Shmuel Dovid Newman, Redondo Beach, CA (US); Jeff Brown, North Logan, UT (US)

(73) Assignee: YSN Imports, Inc., Gardena, CA (US)

( * ) Notice: Subject to any disclaimer, the term of this patent is extended or adjusted under 35 U.S.C. 154(b) by 0 days.

(21) Appl. No.: 12/776,267

(22) Filed: May 7, 2010

(65) Prior Publication Data

US 2010/0282333 A1  Nov. 11, 2010

Related U.S. Application Data

(60) Provisional application No. 61/215,726, filed on May 8, 2009.

(51) Int. Cl.
*F16K 15/20* (2006.01)
(52) U.S. Cl. .................. 137/226; 137/493.8; 137/493.9; 137/512.2; 137/614.18
(58) Field of Classification Search .................. 137/226, 137/228, 102, 493.9, 512.2, 614.16–614.18, 137/493.8
See application file for complete search history.

(56) References Cited

U.S. PATENT DOCUMENTS

| | | | | |
|---|---|---|---|---|
| 1,053,623 A * | 2/1913 | McMillion | ..................... | 137/226 |
| 1,255,411 A * | 2/1918 | Greenwald | ................. | 137/234.5 |
| 1,305,263 A * | 6/1919 | Earnheart | ..................... | 137/228 |
| 1,423,873 A * | 7/1922 | Newsom et al. | .............. | 137/223 |
| 1,434,708 A * | 11/1922 | Kelsey | ........................... | 137/226 |
| 1,806,983 A * | 5/1931 | Norgren | ........................ | 137/223 |
| 1,934,572 A * | 11/1933 | Sutton | ........................... | 137/226 |
| 2,312,679 A * | 3/1943 | Speth | .......................... | 137/234.5 |
| 3,454,033 A * | 7/1969 | Smith | ........................... | 137/226 |
| 3,747,626 A | 7/1973 | Valentino | | |
| 4,445,527 A | 5/1984 | Leimbach | | |
| 4,597,410 A * | 7/1986 | Wilke | ........................... | 137/491 |
| 5,181,977 A * | 1/1993 | Gneiding et al. | ............. | 137/226 |
| 5,623,964 A | 4/1997 | Tsai | | |
| 5,694,969 A | 12/1997 | DeVuyst | | |
| 5,778,923 A | 7/1998 | Marston | | |
| 6,079,519 A | 6/2000 | Lottes | | |
| 6,276,391 B1 * | 8/2001 | Wu | ............................... | 137/223 |
| 7,073,527 B1 | 7/2006 | Freire Teiga | | |
| 7,404,412 B2 * | 7/2008 | Milanovich et al. | .......... | 137/226 |
| 7,624,752 B2 * | 12/2009 | Huang | .......................... | 137/226 |

OTHER PUBLICATIONS

KIPO International Search Report (ISR) and Written Opinion in co-pending application PCT/US2010/033670.

* cited by examiner

*Primary Examiner* — Craig Schneider
*Assistant Examiner* — Craig J Price
(74) *Attorney, Agent, or Firm* — Lance M. Pritikin; Bruce A. Jagger

(57) ABSTRACT

A safety relief fill valve adapted to being an interface for filling and relieving excess pressure from a closed fluid system. An insert shell retains a piston member for movement between fluid input and fluid holding configurations, the piston member being resiliently biased toward fluid holding configuration. When in fluid holding configuration, the piston member sealingly engages an inlet bore of the insert shell. When in fluid input configuration, the piston member allows fluid flow through the inlet bore. A housing receives the insert shell, thereby limiting relative axial movement and forming a cavity between a portion of the housing the insert shell. This cavity provides mechanical guidance and a flow channel for an overpressure relief system having fluid retaining and fluid relief configurations, the overpressure relief system being elastically biased toward fluid retaining configuration. The elastic bias is overcome responsive to excess pressure within the closed fluid system.

16 Claims, 4 Drawing Sheets

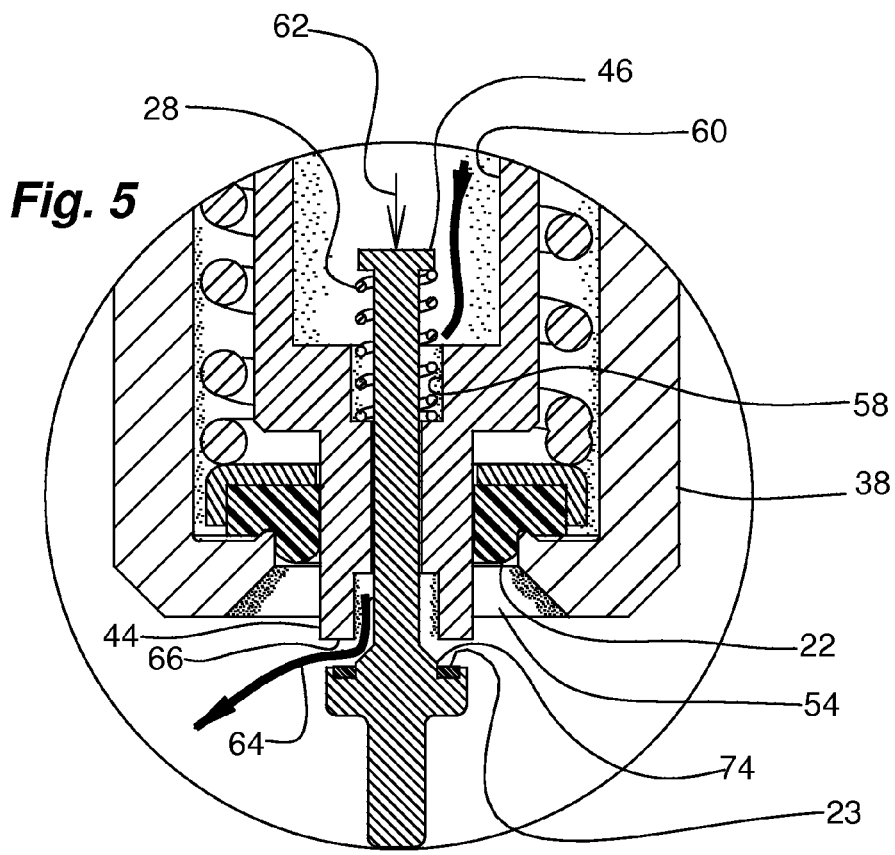
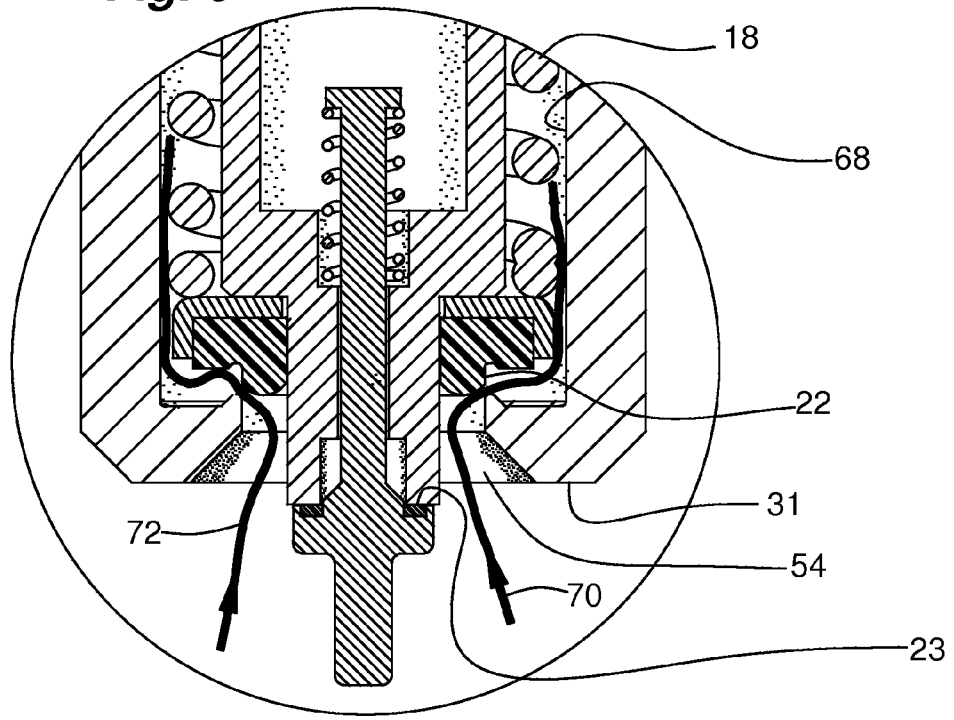

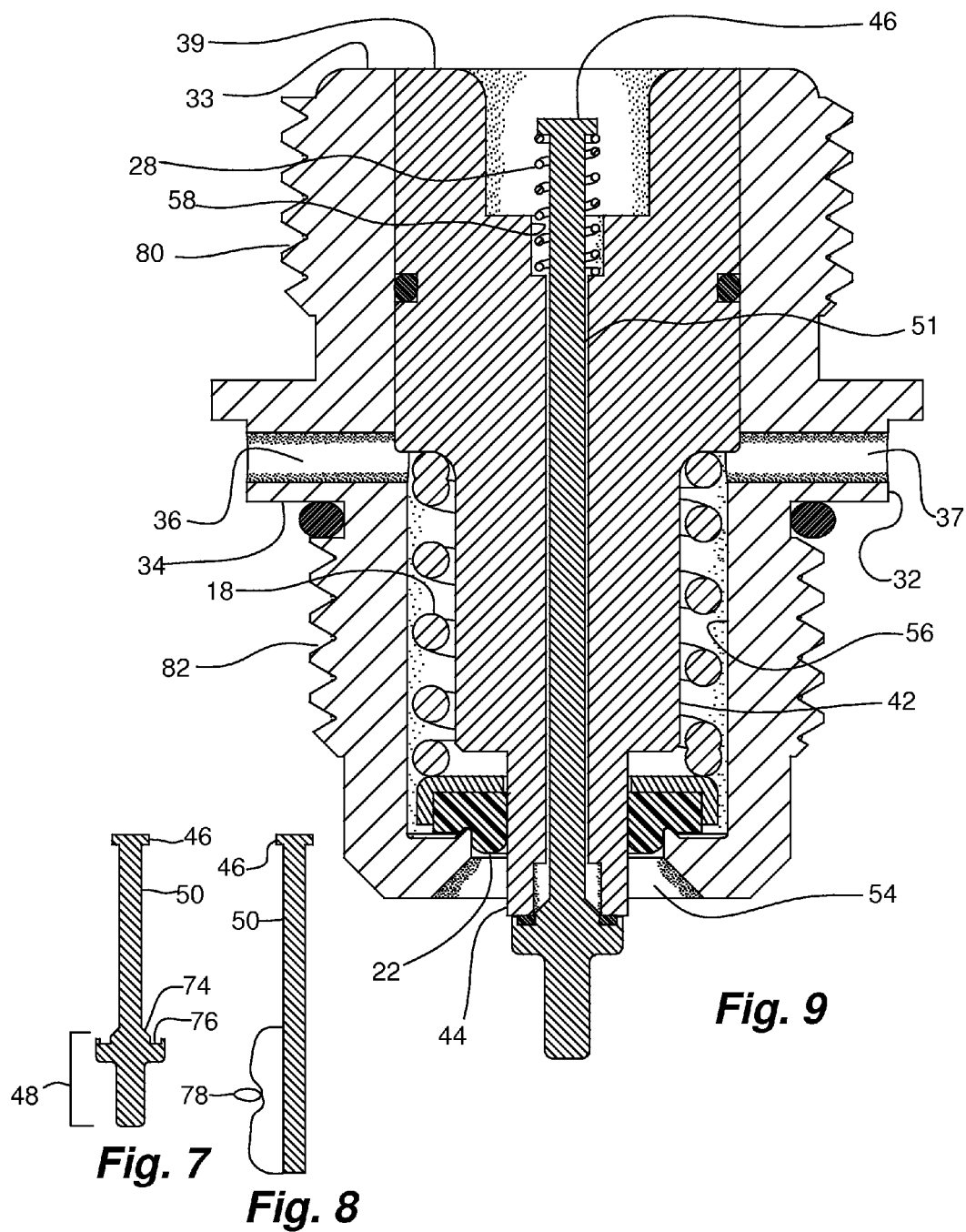

SAFETY RELIEF FILL VALVE ASSEMBLY

RELATED APPLICATIONS

This application claims the benefit of U.S. Provisional Application No. 61/215,726 filed May 8, 2009, the content of which is incorporated by this reference in its entirety for all purposes as if fully set forth herein.

TECHNICAL FIELD OF THE INVENTION

The present invention relates generally to valves used for filling pressurized closed fluid systems. More particularly, the invention concerns an input valve assembly capable of relieving excess pressure from within a closed fluid system.

BACKGROUND OF THE INVENTION

Safe operation of pressurized closed fluid systems requires a careful balance between maintaining the necessary pressure or fluid density to support the application of the system and avoiding exceeding the structural limitations of the system. This balance becomes particularly important when the system is designed for use by average consumers who may not be aware of how to avoid overfilling such a system or understand the risks posed by exceeding the pressure limitations of the system. Examples of such pressurized closed fluid systems include small tanks used to supply pressurized gas to recreational paintball markers and tanks used to store pressurized propane.

The combination of fill and relief valves in a single housing is known. U.S. Pat. No. 3,747,626, the disclosure of which is hereby incorporated by reference as if fully set forth herein, teaches, in part, a combined fill and relief valve wherein the fill valve is biased toward an open position. However, this kind of system does not appear to teach or suggest use as a fill valve where the inlet side is typically left exposed to ambient pressure.

U.S. Pat. No. 6,079,519, the disclosure of which is hereby incorporated by reference as if fully set forth herein, appears to teach, in part, a fill and relief valve with a grease fitting on the inlet side of the valve and a required chamber relief bore disposed between the valve's transverse relief port and the atmosphere in order to vent overpressurized grease to the atmosphere. The apparent resulting additional relief bore length substantially increases susceptibility to clogging of the pressure relieving feature of the valve.

U.S. Pat. No. 5,694,969, the disclosure of which is hereby incorporated by reference as if fully set forth herein, teaches a pressure relief tire valve with independent input and over-pressure valves axially aligned with each other. However, the mechanism appears to require the forming or machining of longitudinal grooves along the inner wall of the chamber to allow pressurized fluid to flow around the overpressure valve portion of the mechanism, thereby adding cost and complexity to the manufacturing of the mechanism.

U.S. Pat. No. 7,073,527, the disclosure of which is hereby incorporated by reference as if fully set forth herein, teaches, in part, an apparatus for regulating the internal pressure of a closed system, comprising concentrically aligned intake and release valves. However, as illustrated by the drawings of the disclosure, the mechanism comprises a setting nut which appears to require the tapping of partially hidden threading. Such a machining operation can add significant cost and complexity to the manufacturing of such an apparatus.

Accordingly, there exists a need for a fill and relief valve assembly which is reliable and inexpensive to manufacture, establishes and maintains a fluid seal between the pressurized closed fluid system and the ambient pressure environment when a fill source nozzle is removed from the input side of the valve, and avoids relief port clogging while minimizing the radial diameter of the valve. There is a need for the combination of these features in one valve assembly.

SUMMARY OF THE INVENTION

By way of summary, the embodiments concern a safety relief fill valve assembly adapted to being an interface for filling and relieving excess pressure from a closed fluid system. The safety relief fill valve assembly generally comprises a piston member, an insert shell, a housing and an overpressure relief system.

The insert shell has a first end, a second end and an inlet bore extending therebetween. The inlet bore is adapted to retain the piston member therewithin for movement between fluid input and fluid holding configurations. The piston member is adapted to sealingly engage the inlet bore when in its fluid holding configuration, and to allow fluid flow through the inlet bore when in its fluid input configuration. The piston member is resiliently biased toward its fluid holding configuration. The resilient bias is adapted to being overcome responsive to a predetermined level of mechanical force applied to the piston member. The resilient bias is typically provided by a piston spring adapted to being positioned generally around the piston member.

It should be noted that the input bore is adapted to allow pressurized fluid to flow around the radial wall of the piston member as the pressurized fluid passes through the input bore. Typically this results from a loose fit between the input bore and the piston member, but can, for example, also result from axial bypass grooves formed along the portion of the input bore wall closest to the piston member.

The housing has a proximal end, a distal end, a main bore extending therebetween a proximal portion adjacent said proximal end and at least one relief port. The proximal portion is adapted to be received by a closed fluid system. The main bore is adapted to receive the insert shell therewithin such that the insert shell extends within the proximal portion. What generally results is a concentric relationship between the housing, the insert shell and the piston member.

The overpressure relief system is adapted to having fluid retaining and fluid relief configurations. The proximal end of the housing is adapted to being in fluid communication with the relief port when the overpressure bypass system is in its fluid relief configuration. The overpressure relief system is elastically biased toward its fluid retaining configuration. This elastic bias is adapted to being overcome responsive to the mentioned excess pressure.

In embodiments, the insert shell has an outer wall sealingly received within said main bore. This sealing engagement may result from an adhesive bond, press-fit, an o-ring, a weld, or another process by which two parts may be sealingly engaged. The overpressure relief system generally includes a relief seal member. The relief seal member is actuatably received between the insert shell and the housing approximately adjacent the proximal end. The relief seal member is capable of establishing a fluid seal between the housing and the insert shell when said overpressure relief system is in its fluid retaining configuration.

Embodiments of a safety relief fill valve assembly further comprise an o-ring and a retention sleeve. The o-ring is adapted to be receivingly engaged by the inlet bore and establishing a fluid seal between the inlet bore and an input nozzle of a source of pressurized fluid. The retention sleeve is adapted to being fixedly engaged with the insert shell, generally for the purpose of limiting the axial movement of the o-ring within the input bore.

The piston member in some embodiments includes a stem segment, a hold side segment, and a piston seal. The hold side segment is adjacent the first piston end and the stem segment is adjacent said second piston end. The stem segment and hold side segment are adapted to being secured in mating engagement, by, for example, press-fit, adhesive bond, or some other resilient mating process. The piston seal is disposed approximately between the stem segment and the hold side segment, and is adapted to establish a fluid seal between approximately the insert shell and the inlet bore when the piston member is in its fluid holding configuration.

In certain embodiments the housing further has a proximal portion adjacent the proximal end. The proximal portion may be adapted to being threadably received by the closed fluid system.

In particular embodiments, the relief port is adapted to releasing overpressurized fluid from the main bore in a direction approximately radial of the main bore.

In embodiments with a relief seal member, the elastic bias is typically provided by a main spring. This main spring is adapted to being actuatably received within the main bore and generally around the insert shell. The relief seal member includes a seal portion and a slip form portion. The slip form portion is adapted to securely engage the seal portion and be substantially axially disposed between said seal portion and said main spring.

The detailed description of embodiments of the safety relief fill valve assembly is intended to serve merely as examples, and is in no way intended to limit the scope of the appended claims to these described embodiments. Accordingly, modifications to the embodiments described are possible, and it should be clearly understood that the invention may be practiced in many different was than the embodiments specifically described below, and still remain within the scope of the claims.

BRIEF DESCRIPTION OF THE DRAWINGS

Further advantages of the present invention may become apparent to those skilled in the art with the benefit of the following detailed description of the preferred embodiments and upon reference to the accompanying drawings in which:

FIG. 5 is a fragmentary cross-sectional view of the embodiment of FIG. 1 in which the overpressure relief system is in fluid retaining configuration and the piston member is in said fluid input configuration;

FIG. 6 is a fragmentary cross-sectional view of the embodiment of FIG. 1 in which the overpressure relief system is in fluid relief configuration and the piston member is in fluid holding configuration;

FIG. 7 is a diagrammatic cross-sectional view of a piston member fully formed from a single piece of material;

FIG. 8 is a diagrammatic cross-sectional view of a single piece of material from which a piston member of FIG. 7 becomes fully formed, the shape of the piston member prior to being fully formed allowing its insertion through the inlet bore; and FIG. 9 is a cross-sectional view of an embodiment of a safety relief fill valve assembly in which the proximal portion of the housing is adapted to being threadably received by a closed fluid system.

Figure 1:
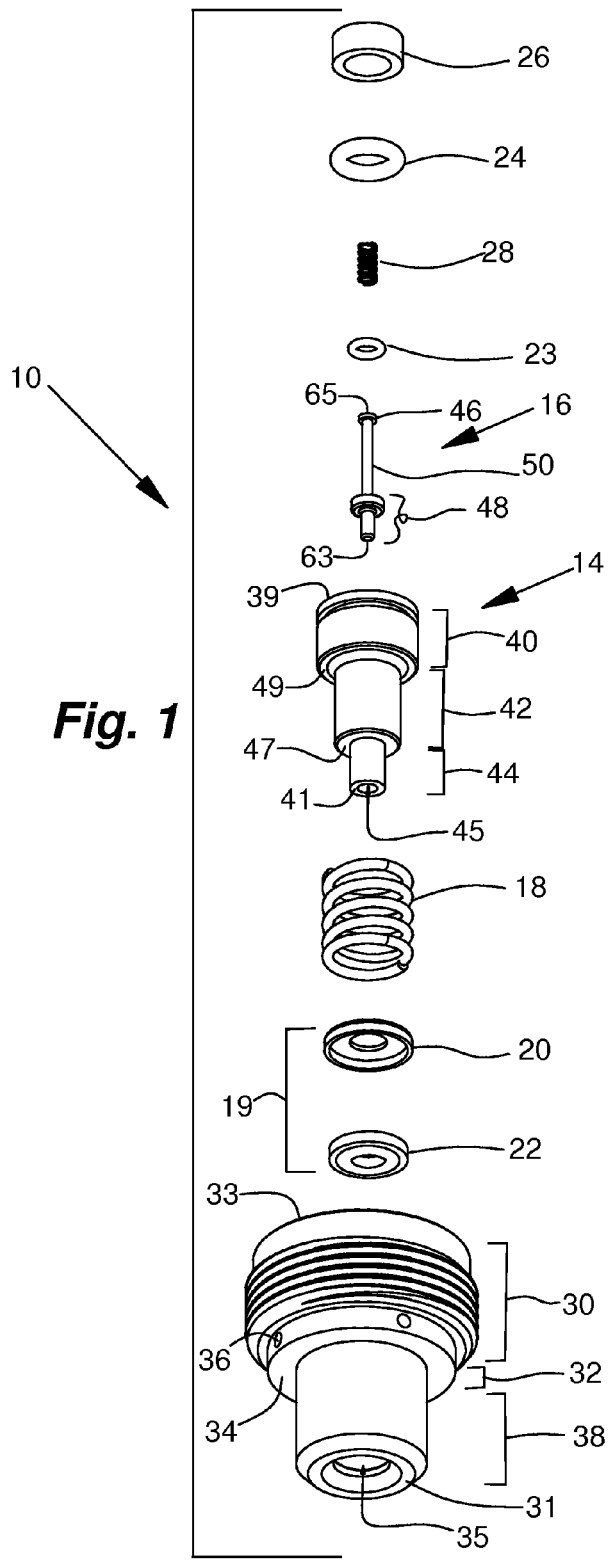
FIG. 1 is an exploded view of an embodiment of a safety relief fill valve assembly.

While the invention is susceptible to various modifications and alternative forms, specific embodiments thereof are shown by way of example in the drawings and may herein be described in detail. The drawings may not be to scale. It should be understood, however, that the drawings and the detailed description thereto are not intended to limit the invention to the particular for disclosed, but to the contrary, the intention is to cover all modifications.

DETAILED DESCRIPTION OF THE INVENTION

Figure 2:
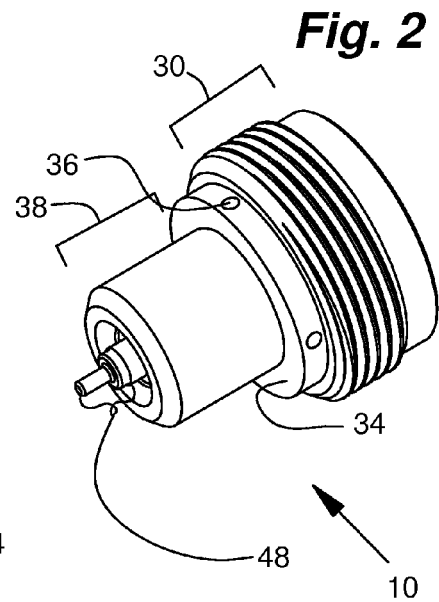
FIG. 2 is a perspective view of the embodiment of FIG. 1.
Figure 3:
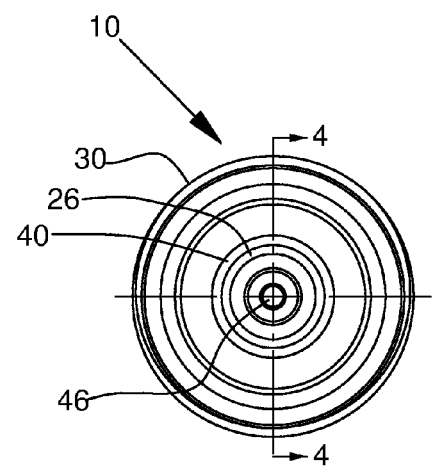
FIG. 3 is a bottom view of the embodiment of FIG. 1.

Referring particularly to the FIGS. for the purposes of illustration of the best modes only, and not limitation, embodiments of a safety relief fill valve are shown generally at 10. FIG. 2 illustrates a fully assembled safety relief fill valve assembly 10 adapted to being an interface for filling and relieving excess pressure from a closed fluid system. Turning to FIG. 1, the safety relief fill valve assembly 10 generally comprises a piston member 16, an insert shell 14, a housing 12 and an overpressure relief system.

In embodiments, piston member 16 includes a first piston end 63, a second piston end 65, a hold side segment 48 adjacent first piston end 63, a detent cap 46 adjacent second piston end 65, and a stem segment 50 disposed between hold side segment 48 and detent cap 46. Guide chamfer 74 radially guides piston member 16 back toward the radial center of inlet bore 45 as piston member 16 returns toward fluid holding configuration. Seal channel 76 is adapted to retain piston seal 23. Some embodiments require a more elongated stem segment 50 (shown as 51 in FIG. 9).

In the embodiments chosen for illustration, insert shell 14 has a first end 41, a second end 39 and an inlet bore 45 extending therebetween. An upper segment 40 is adjacent second end 39, a lower segment 44 is adjacent first end 41 having a first face 66, and a middle segment 42 is disposed between upper segment 40 and lower segment 44. Referring to FIG. 1, a detent shoulder 47 may be disposed between the lower segment 44 and the middle segment 42. The terms upper, lower and middle are used herein for the purpose of distinction and not to indicate orientation.

Figure 4:
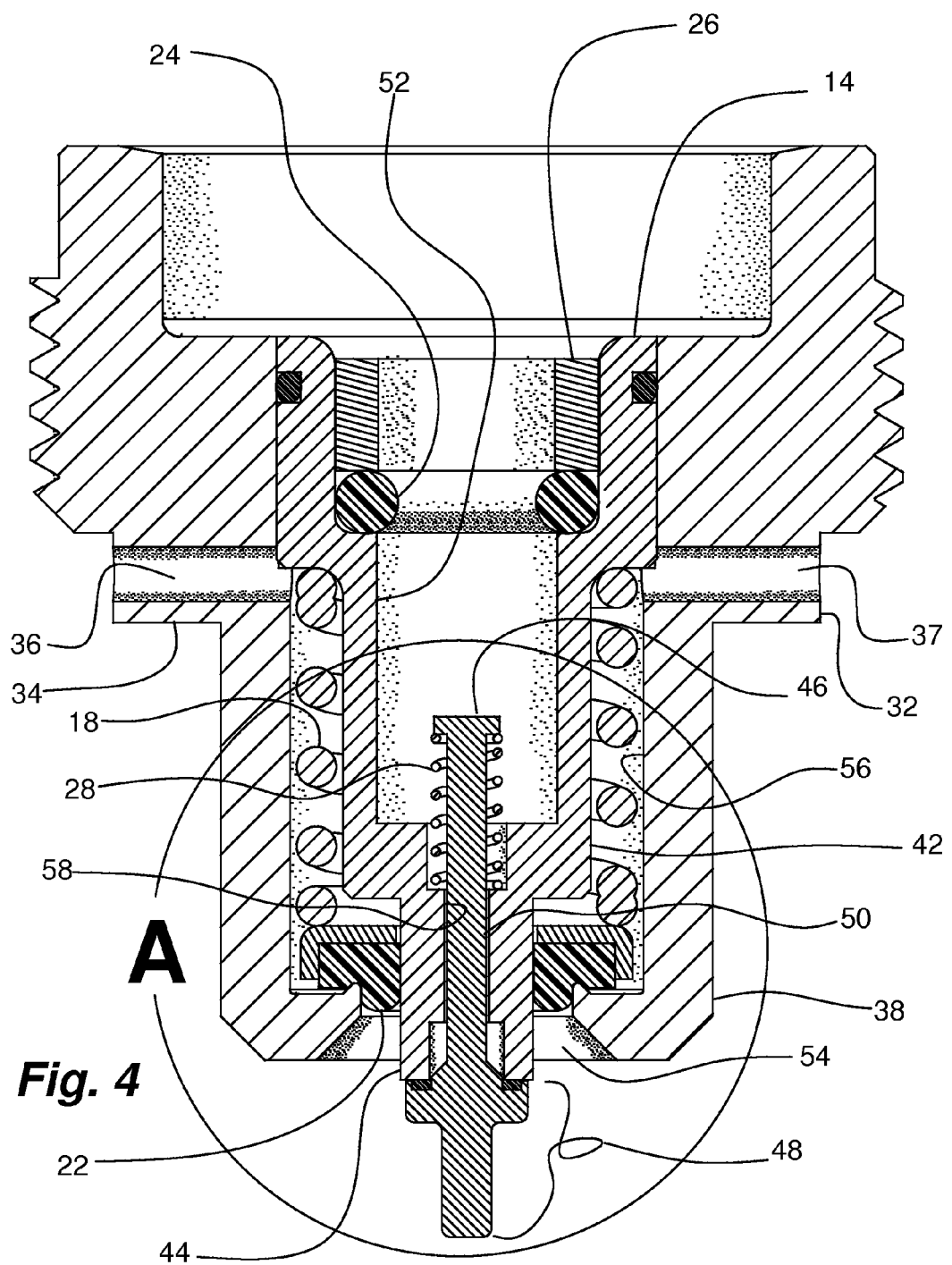
FIG. 4 diagrammatically depicts a cross-sectional view taken along line 4-4 of FIG. 3.

Inlet bore 45 is adapted to retain piston member 16 therewithin for movement between fluid input configuration (see, for example, FIG. 5) and fluid holding configuration (see, for examples, FIGS. 4 and 6). Piston member 16 is adapted to seal inlet bore 45 when in fluid holding configuration, and to allow fluid flow through inlet bore 45 when in fluid input configuration. Piston member 16 is resiliently biased toward fluid holding configuration. Turning to FIG. 5, the resilient bias is adapted to being overcome responsive to a predetermined level of mechanical force 62 applied to piston member 16, generally at detent cap 46. Such mechanical force 62 would typically be applied by the nozzle of a fluid input device during a filling procedure. The resilient bias is typically provided by a piston spring 28 adapted to being positioned generally around the piston member 16 at stem segment 50. In assembled state, piston spring 28 is typically axially retained between detent cap 46 and a portion of input bore 45.

Turning briefly to FIG. 5, it should be noted that input bore 45 is adapted to allow pressurized fluid to flow around the radial wall of piston member 16 (generally at stem segment 50) as the pressurized fluid passes through input bore 45. The inlet flow path is shown, for example, as inlet path 64. Typically this results from a loose radial fit between input bore 45 and piston member 16, but can, for example, also result from axial bypass grooves formed along the portion of the input bore wall 58 closest to piston member 16.

Returning to FIG. 1, in the embodiments chosen for illustration, housing 12 has a proximal end 31, a distal end 33, a main bore 35 extending therebetween, a proximal portion 38 adjacent proximal end 31, a distal portion 30 adjacent distal end 33, an intermediate portion 32 axially disposed between proximal portion 38 and distal portion 30, a shoulder portion 34 disposed between proximal portion 38 and intermediate portion 32, and at least one relief port 36. In particular embodiments, relief port 36 is adapted to releasing overpressurized fluid from the main bore in a direction approximately radial of main bore 35 (as shown, for example, in each of the embodiments chosen for illustration). Also, additional relief ports 37 (as shown, for example, in FIGS. 4 and 9) may be employed. Main bore 35 is adapted to receive insert shell 14 therewithin, generally resulting in a concentric relationship between housing 12, insert shell 14 and piston member 16. In certain embodiments, proximal portion 38 may be adapted to being threadably received by the closed fluid system by way of proximal threading 82 (see, for example, FIG. 9). Similarly, distal portion 30 may be adapted to being threadably received by an inlet nozzle or connector by way of distal threading 80.

The overpressure relief system is adapted to having a fluid retaining configuration (see, for example, FIG. 4) and a fluid relief configuration (see, for example, FIG. 6). Proximal end 31 is adapted to being in fluid communication with relief port 36 when the overpressure bypass system is in its fluid relief configuration (relief flow path partially illustrated, for example, by 70 and 71 in FIG. 6). In embodiments, overpressurized fluid flows into chamfered inlet 54. The overpressure relief system is elastically biased toward its fluid retaining configuration. This elastic bias is adapted to being overcome responsive to excess pressure within the closed fluid system.

In embodiments, insert shell 14 has an outer wall sealingly received within main bore 35. Referring to FIGS. 1 and 4, the outer wall may, for example, be part of the upper segment 40. This sealing engagement may result from an adhesive bond, an o-ring, a weld, or another process by which two parts may be sealingly engaged. In embodiments, this sealing engagement also restricts axial movement between insert shell 14 and housing 12. The overpressure relief system generally includes a relief seal member 19 which itself typically includes a seal portion 22 and a slip form portion 20. Slip form portion 20 is adapted to securely engage seal portion 22 and be substantially axially disposed between seal portion 22 and main spring 18. Relief seal member 19 is actuatably received between insert shell 14 and housing 12 within said proximal portion approximately adjacent proximal end 31. Relief seal member 19 is capable of establishing a fluid seal between housing 12 and insert shell 14 when the overpressure relief system is in its fluid retaining configuration (see, for example, FIG. 4). Referring to FIGS. 1 and 4, the detent shoulder 47 may be adapted to limit movement of the relief seal member 19 toward the second end 39 of the insert shell.

Turning back to FIG. 1 for illustration, certain embodiments of safety relief fill valve assembly 10 further comprise an o-ring 24 and a retention sleeve 26. As illustrated in FIG. 4 for the purpose of example, o-ring 24 is adapted to be receivingly engaged by inlet bore 45 and to removably snugly receive therethrough an input nozzle of a source of pressurized fluid for establishing a fluid seal between inlet bore 45 and the input nozzle. Retention sleeve 26 is adapted to being fixedly engaged with insert shell 14, generally for the purpose of limiting the axial movement of o-ring 24 within input bore 45. Referring to FIGS. 1 and 4 for illustration, in embodiments, the piston member 16 may protrude beyond the proximal portion 38.

In certain embodiments, stem segment 50 and hold side segment 48 are initially separate parts adapted to being secured in mating engagement, by, for example, press-fit, adhesive bond, or some other resilient mating process. Piston seal 23 is disposed approximately between stem segment 50 and hold side segment 48 within seal channel 76, and is adapted to establish a fluid seal between approximately insert shell 14 and inlet bore 45 when piston member 16 is in fluid holding configuration. The construction and method of manufacturing piston member 16 is chosen, in part, to allow initial insertion of piston member 16 through inlet bore 45 during the assembly of safety relief fill valve 10. As illustrated in FIGS. 7 and 8, the majority of piston member 14 can be formed from a single piece of material. For example, unformed portion 78 allows piston member 16 to be inserted through inlet bore 45. Once piston member 16 in inserted through inlet bore 45, unformed portion can be formed into hold side segment 48.

The foregoing detailed description of the invention is intended to be illustrative and is not intended to limit the scope of the invention. Changes and modifications are possible with respect to the embodiments detailed in the foregoing descriptions, and it is understood that the invention may be practiced otherwise than that specifically described herein and still be within the scope of the appended claims.

What is claimed is:

1. A safety relief fill valve assembly adapted to being an interface for filling and relieving excess pressure from a closed fluid system, said safety relief fill valve assembly comprising:

a piston member;

an insert shell having a first end, a second end, an inlet bore extending therebetween, an upper segment adjacent said second end, a lower segment adjacent said first end, a middle segment disposed between said upper and lower segments, and a detent shoulder disposed between said lower segment and said middle segment, said inlet bore adapted to retain said piston member therewithin for movement between fluid input and fluid holding configurations, said piston member adapted to seal said inlet bore when in said fluid holding configuration, and to allow fluid flow through said inlet bore when in said fluid input configuration, said piston member being resiliently biased toward said fluid holding configuration, said resilient bias adapted to being overcome responsive to a predetermined level of mechanical force applied to said piston member;

a housing having a proximal end, a distal end, a main bore extending therebetween and at least a relief port, said main bore adapted to receive said insert shell therewithin such that said upper segment is sealingly received within said main bore; and an overpressure relief system adapted to having fluid retaining and fluid relief configurations, said proximal end adapted to being in fluid communication with said relief port when said overpressure relief system is in said fluid relief configuration, said overpressure relief system being elastically biased toward said fluid retaining configuration, said elastic bias adapted to being overcome responsive to said excess pressure, said overpressure relief system including a relief seal member actuatably received between said insert shell and said housing, said relief seal member being capable of establishing a fluid seal between said housing and said insert shell when said overpressure relief system is in said fluid retaining configuration, said elastic bias being provided by a main spring, said main spring being adapted to being actuatably received within said main bore and generally around said insert shell, said detent shoulder being adapted to limit movement of said relief seal member toward said second end.

2. The safety relief fill valve assembly as defined in claim 1 in which said resilient bias is provided by a piston spring, said piston spring adapted to being positioned generally around said piston member.

3. The safety relief fill valve assembly as defined in claim 1 further comprising an o-ring and a retention sleeve, said o-ring adapted to be receivingly engaged by said inlet bore and to removably snugly receive therethrough an input nozzle of a source of pressurized fluid for establishing a fluid seal between said inlet bore and said nozzle, said retention sleeve adapted to being fixedly engaged with said insert shell.

4. The safety relief fill valve assembly as defined in claim 1 in which said piston member includes a stem segment, a hold side segment, a detent cap, and a piston seal, said hold side segment being adjacent a first piston end, said detent cap being adjacent a second piston end, said stem segment being disposed between said hold side segment and said detent cap, said stem segment and said hold side segment adapted to being secured in mating engagement, said piston seal being disposed approximately between said stem segment and said hold side segment, said piston seal being adapted to establish a fluid seal between approximately said insert shell and said inlet bore when said piston member is in said fluid holding configuration.

5. The safety relief fill valve assembly as defined in claim 1 in which said housing further has a proximal portion adjacent said proximal end, said proximal portion adapted to being threadably received by said closed fluid system.

6. The safety relief fill valve assembly as defined in claim 1 in which said relief port is adapted to releasing overpressurized fluid from said main bore in a direction approximately radial of said main bore.

7. The safety relief fill valve assembly as defined in claim 1 in which said relief seal member includes a seal portion and a slip form portion, said slip form portion adapted to securedly engage said seal portion and be substantially axially disposed between said seal portion and said main spring.

8. A safety relief fill valve assembly adapted to being an interface for filling and relieving excess pressure from a closed fluid system, said safety relief fill valve assembly comprising:
a piston member;
an insert shell having a first end, a second end, an inlet bore extending therebetween, and a detent shoulder, said inlet bore adapted to retain said piston member therewithin for movement between fluid input and fluid holding configurations, said piston member adapted to seal said inlet bore when in said fluid holding configuration, and to allow fluid flow through said inlet bore when in said fluid input configuration, said piston member being resiliently biased toward said fluid holding configuration, said resilient bias adapted to being overcome responsive to a predetermined level of mechanical force applied to said piston member;
a housing having a proximal end, a distal end, a main bore extending therebetween and at least a relief port, said main bore adapted to receive said insert shell therewithin;
an overpressure relief system adapted to having fluid retaining and fluid relief configurations, said proximal end adapted to being in fluid communication with said relief port when said overpressure relief system is in said fluid relief configuration, said overpressure relief system being elastically biased toward said fluid retaining configuration, said elastic bias adapted to being overcome responsive to said excess pressure, said overpressure relief system including a relief seal member actuatably received between said insert shell and said housing approximately adjacent said proximal end, said relief seal member being capable of establishing a fluid seal between said housing and said insert shell when said overpressure relief system is in said fluid retaining configuration; and
a main spring providing said elastic bias, said main spring adapted to being actuatably received within said main bore and generally around said insert shell, said relief seal member including a seal portion and a slip form portion, said slip form portion adapted to securedly engage said seal portion and be substantially axially disposed between said seal portion and said main spring, said detent shoulder being adapted to limit movement of said relief seal member toward said second end.

9. The safety relief fill valve assembly as defined in claim 8 in which said resilient bias is provided by a piston spring, said piston spring adapted to being positioned generally around said piston member.

10. The safety relief fill valve assembly as defined in claim 8 further comprising an o-ring and a retention sleeve, said o-ring adapted to be receivingly engaged by said inlet bore and to removably snugly receive therethrough an input nozzle of a source of pressurized fluid for establishing a fluid seal between said inlet bore and said nozzle, said retention sleeve adapted to being fixedly engaged with said insert shell.

11. The safety relief fill valve assembly as defined in claim 8 in which said piston member includes a stem segment, a hold side segment, a detent cap and a piston seal, said hold side segment being adjacent said first piston end, said detent cap being adjacent said second piston end, said stem segment being disposed between said hold side segment and said detent cap, said stem segment and said hold side segment adapted to being secured in mating engagement, said piston seal being disposed approximately between said stem segment and said hold side segment, said piston seal being adapted to establish a fluid seal between approximately said insert shell and said inlet bore when said piston member is in said fluid holding configuration.

12. The safety relief fill valve assembly as defined in claim 8 in which said housing further has a proximal portion adjacent said proximal end, said proximal portion adapted to being threadably received by said closed fluid system.

13. The safety relief fill valve assembly as defined in claim 8 in which said relief port is adapted to releasing overpressurized fluid from said main bore in a direction approximately radial of said main bore.

14. A safety relief fill valve assembly adapted to being an interface for filling and relieving excess pressure from a closed fluid system, said safety relief fill valve assembly comprising:
a piston member;
an insert shell having a first end, a second end, and an inlet bore extending therebetween, said inlet bore adapted to retain said piston member therewithin for movement between fluid input and fluid holding configurations, said piston member adapted to seal said inlet bore when in said fluid holding configuration, and to allow fluid flow through said inlet bore when in said fluid input configuration, said piston member being resiliently biased toward said fluid holding configuration, said resilient bias adapted to being overcome responsive to a predetermined level of mechanical force applied to said piston member;

a housing having a proximal end, a distal end, a main bore extending therebetween and at least a relief port, said main bore adapted to receive said insert shell therewithin;

an overpressure relief system adapted to having fluid retaining and fluid relief configurations, said proximal end adapted to being in fluid communication with said relief port when said overpressure relief system is in said fluid relief configuration, said overpressure relief system being elastically biased toward said fluid retaining configuration, said elastic bias adapted to being overcome responsive to said excess pressure; and an o-ring and a retention sleeve, said o-ring adapted to be receivingly engaged by said inlet bore, and to removably receive therethrough an input nozzle of a source of pressurized fluid for establishing a fluid seal between said inlet bore and said nozzle, said retention sleeve adapted to being fixedly engaged with said insert shell for limiting the axial movement of said o-ring within said input bore;

wherein said insert shell includes a detent shoulder and said overpressure relief system includes a relief seal member actuatably received between said insert shell and said housing, said relief seal member being capable of establishing a fluid seal between said housing and said insert shell when said overpressure relief system is in said fluid retaining configuration, said elastic bias being provided by a main spring, said main spring being adapted to being actuatably received within said main bore and generally around said insert shell, said detent shoulder being adapted to limit movement of said relief seal member toward said second end.

15. The safety relief fill valve assembly as defined in claim 14 in which said relief seal member includes a seal portion and a slip form portion, said slip form portion adapted to securely engage said seal portion and be substantially axially disposed between said seal portion and said main spring.

16. A safety relief fill valve assembly adapted to being an interface for filling and relieving excess pressure from a closed fluid system, said safety relief fill valve assembly comprising:

a piston member;

an insert shell having a first end, a second end, and an inlet bore extending therebetween, said inlet bore adapted to retain said piston member therewithin for movement between fluid input and fluid holding configurations, said piston member adapted to seal said inlet bore when in said fluid holding configuration, and to allow fluid flow through said inlet bore when in said fluid input configuration, said piston member being resiliently biased toward said fluid holding configuration, said resilient bias adapted to being overcome responsive to a predetermined level of mechanical force applied to said piston member;

a housing having a proximal end, a distal end, a main bore extending therebetween, a proximal portion adjacent said proximal end and at least a relief port, said proximal portion being adapted to be received by said closed fluid system, said main bore adapted to receive said insert shell therewithin such that said insert shell extends within said proximal portion, said piston member protruding externally beyond said proximal portion; and an overpressure relief system adapted to having fluid retaining and fluid relief configurations, said proximal end adapted to being in fluid communication with said relief port when said overpressure relief system is in said fluid relief configuration, said overpressure relief system being elastically biased toward said fluid retaining configuration, said elastic bias adapted to being overcome responsive to said excess pressure;

wherein said overpressure relief system includes a relief seal member actuatably received between said insert shell and said housing, said relief seal member being capable of establishing a fluid seal between said housing and said insert shell when said overpressure relief system is in said fluid retaining configuration, said elastic bias being provided by a main spring, said main spring being adapted to being actuatably received within said main bore and generally around said insert shell.

* * * * *